United States Patent [19]

Talley et al.

[11] Patent Number: 4,769,439

[45] Date of Patent: Sep. 6, 1988

[54] POLYIMIDES AND METHOD FOR MAKING

[75] Inventors: John J. Talley, Clifton Park; John C. Carpenter, Schenectady, both of N.Y.

[73] Assignee: General Electric Company, Schenectady, N.Y.

[21] Appl. No.: 912,852

[22] Filed: Sep. 29, 1986

[51] Int. Cl.$^4$ ............................................. C08G 8/02
[52] U.S. Cl. ..................... 528/176; 528/125; 528/126; 528/128; 528/172; 528/185; 528/353
[58] Field of Search ............... 528/125, 126, 185, 353, 528/172, 128

[56] References Cited

U.S. PATENT DOCUMENTS 4,526,838  7/1985  Fujioka et al. .................. 528/172
4,550,156 10/1985  Gallagher ......................... 528/125

Primary Examiner—John Kight
Assistant Examiner—M. L. Moore
Attorney, Agent, or Firm—William A. Teoli; James C. Davis, Jr.; James Magee, Jr.

[57] ABSTRACT

Substantially transparent and flexible polyimide films are provided having reduced $T_g$'s which result from the intercondensation of bisaminoformals and aromatic bis(anhydrides).

11 Claims, No Drawings

POLYIMIDES AND METHOD FOR MAKING

BACKGROUND OF THE INVENTION

Prior to the present invention, as shown by Heath et al., U.S. Pat. No. 3,847,867, assigned to the same assignee as the present invention, polyetherimides were made by effecting reaction between aromatic bis(etheranhydride) and organic diamine in the presence of an organic solvent. Although valuable injection moldable polyetherimides can be made by the Heath et al. procedure, in many instances the glass transition temperature of the products, such as 220° C., are sometimes too high for particular applications. In addition, polyetherimides are often tinted and therefore are unsuitable for applications requiring transparent material.

The present invention is based on our discovery that transparent polyimides having significantly lower Tgs can be made by effecting reaction between aromatic bis(etheranhydride), such as 2,2-bis[4-(3,4-dicarboxyphenoxy)phenyl]propanedianhydride-(BPADA) and organic diamine having the formula,

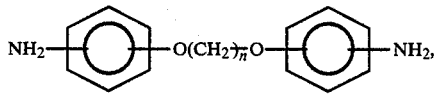
(1)

where n is an integer having a value of from 1–5 inclusive.

STATEMENT OF THE INVENTION

There is provided by the present invention, flexible film forming polyimide consisting essentially of chemically combined units of the formula,

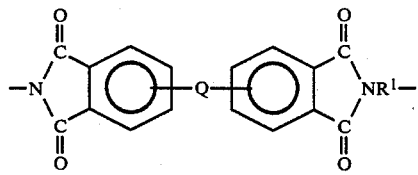
(2)

where Q is a divalent radical selected from —O—, —S—,

and —ORO—, R is a $C_{(6-30)}$ divalent aromatic organic radical, $R^1$ is

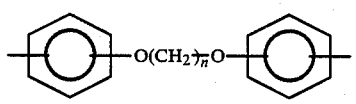
(3)

and n is as previously defined.

Radicals included within R of formula (2) are, for example,

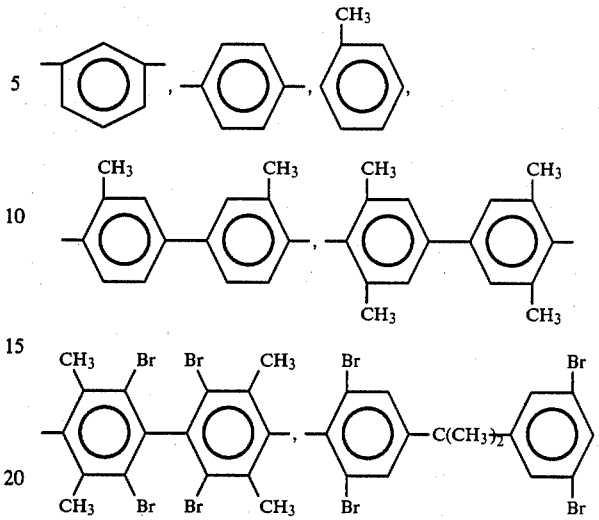

and divalent organic radicals of the general formula,

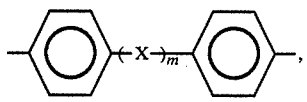

where X is a member selected from the class consisting of divalent radicals of the formulas

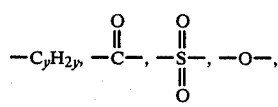

and —S—, where m is 0 or 1, y is a whole number equal to from 1 to 5 inclusive.

Polyimide consisting essentially of chemically combined units of formula (2) can be made by effecting reaction between aromatic bis(anhydride) of the formula,

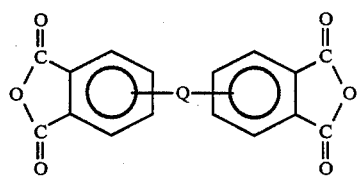
(4)

and organic diamine of formula (1), where Q is as previously defined.

Some of the aromatic bis(anhydride)s included within formula (4) are, for example, phenoxyphenyl dianhydride, thiophenoxyphenyl dianhydride, benzophenone dianhydride and aromatic bis(etheranhydride) of the formulas,

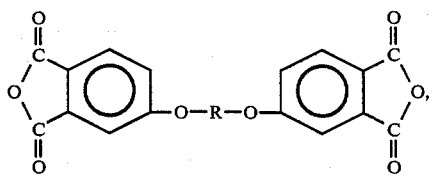

-continued

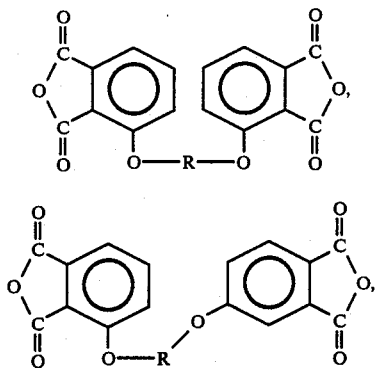

where R is as previously defined. Some of the above aromatic bis(etheranhydride) are, more particularly 2,2-bis[4-(2,3-dicarboxyphenoxy]propane dianhydride and 2,2-bis[4-(3,4-dicarboxyphenoxy]propane dianhydride.

The aromatic bisanhydrides of formula (4) are preferably aromatic bis(etheranhydride)s which can be made by effecting reaction between a nitrophthalimide and an alkali diphenoxide, as shown by Heath et al., U.S. Pat. No. 3,879,428, assigned to the same assignee as the present invention and incorporated herein by reference.

Included by the above described alkali diphenoxide salts of U.S. Pat. No. 3,879,428 are sodium and potassium salts of the following dihydric phenols:
2,2-bis-(2-hydroxyphenyl)propane,
2,4'-dihydroxydiphenylmethane,
4,4'-dihydroxydiphenylmethane,
bis-(2-hydroxyphenyl)methane;
2,2-bis-(4-hydroxyphenyl)propane hereinafter identified as "bisphenol-A" or "BPA",
1,1-bis-(4-hydroxyphenyl)ethane,
1,1-bis-(4-hydroxyphenyl)propane,
2,2-bis-(4-hydroxyphenyl)pentane,
3,3-bis-(4-hydroxyphenyl)pentane,
4,4'-dihydroxybiphenyl,
4,4'-dihydroxy-3,3,5,5'-tetramethylbiphenyl,
2,4'-dihydroxybenzophenone,
4,4'-dihydroxybenzophenone,
4,4'-dihydroxydiphenylsulfone,
2,4'-dihydroxydiphenylsulfone,
4,4'-dihydroxydiphenyl sulfoxide,
4,4'-dihydroxydiphenyl sulfide,
hydroquinone,
resorcinol,
3,4'-dihydroxydiphenylmethane,
4,4'-dihydroxybenzophenone, and
4,4'-dihydroxydiphenylether.

Diaminoformals which can be used in the practice of the present invention and included within formula (1) are, for example, bis(4-aminophenoxy)methane, bis(3-aminophenoxy)methane, 1,2-bis(4-aminophenoxy)ethane, 1,3-bis(4-aminophenoxy)propane, 1,4-bis(4-aminophenoxy)butane, 1,5-bis(4-aminophenoxy)pentane, 1,2-bis(3-aminophenoxy)ethane, 1,3-bis(3-aminophenoxy)propane, 1,4-bis(3-aminophenoxy)butane, 1,5-bis(3-aminophenoxy)pentane, and the like. These diaminoformals can be prepared in accordance with the method shown by R. F. Collins, et al., Chemistry and Industry 1072 (1954), or R. F. Collins et al., Brit. J. Pharmcol. 13, 283 (1958); Bergel, F. et al., J. Chem. Soc. (1959), 2890; and McMillan, F. H., J. Am. Chem. Soc. (1952), 74, 5229.

In a further aspect of the present invention, there is provided a method for making polyimides which comprises (1) effecting reaction between substantially equal molar amounts of aromatic bis(anhydride) of formula (4) and bisaminoformals of formula (1), and (2) recovering polyimide from the resulting mixture of (1).

In the practice of one form of the present invention, reaction is effected under ambient conditions between substantial equal molar amounts of the aromatic bis(anhydride) referred to hereinafter as BDA and the diaminoformal referred to hereinafter as "DAF" in the presence of an organic solvent to produce a polyamic acid. A suitable organic solvent which can be utilized in the practice of the method of the present invention are, for example, ortho-dichlorobenzene, toluene, dimethylformamide, benzene, dimethylacetamide, dimethylsulfoxide, N-methylpyrrolidinone, chlorobenzene, chloroform and the like. The polyamic acid can then be applied onto a substrate and heated at a temperature up to 300° C. to effect conversion in the polyamic acid.

Alternatively the reaction between the BDA and DAF can be effected in the presence of a refluxing organic solvent and thereafter precipitated in a polar solvent such as methanol and recovered by filtration followed by drying.

Polymerization of the BDA and the DAF preferably conducted in a nonoxidizing atmosphere such as a nitrogen atmosphere to minimize oxidation of the reactants and the resulting polyetherimide. It has also been found that polymerization accelerators, for example 4-dimethylaminopyrridine or alkali metal phenylphosphonates can be utilized to accelerate the polymerization reaction.

If desired, the substantially transparent flexible polyimide films of the present invention can be reinforced by solution or melt blending with various fillers, for example, glass fibers, carbon fibers, and the like.

There can be utilized from 1 to 100 parts of filler per hundred parts of polymer.

In order that those skilled in the art will be better able to practice the present invention, the following examples are given by way of illustration and not by way of limitation. All parts are by weight.

EXAMPLE 1

There was added 3.85 grams (0.0316 mol) of 4-dimethylaminopyridine to a solution of 35.15 grams (0.153 mol) of bis-(4-aminophenoxy)methane, 79.56 grams (0.153 mol) of 2,2-bis[4-(3,4-dicarboxyphenoxy)phenylpropanedianhydride] and 270 grams of ortho-dichlorobenzene under a nitrogen atmosphere. The mixture was stirred and gradually heated to 140° C. to effect the distillation of a water/ortho-dichlorobenzene azeotrope. After about 2 hours, the water evolution ceased and the solution was cooled to room temperature and diluted with 200 mL of chloroform. The mixture was then poured into rapidly stirring methanol. A product precipitated which was isolated by filtration, washed with excess methanol and vacuum dried. There was obtained 105.36 grams or 96.4% yield of a polyimide consisting essentially of chemically combined units of the formula,

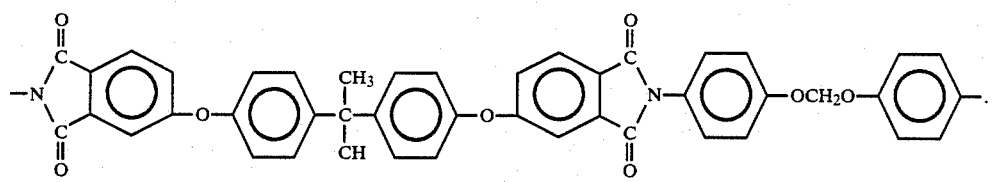

The above product was compression molded at 500° F. between Teflon treated plates at two ton pressure. A transparent flexible bar was obtained which was also injection moldable.

The above procedure was repeated utilizing additional aromatic bis(anhydride)s and both bis-(4-aminophenoxy)methane or "para" and bis-(3-aminophenoxy)methane "meta". The following results were obtained where "S" is soluble, "I" is insoluble, and "NMP" is N-methylpyrrolidinone.

TABLE
POLYFORMALIMIDES

| Dianhydride | Tg°C.[a] Para | Tg°C.[b] Meta | Solubility[c] | | | | | |
|---|---|---|---|---|---|---|---|---|
| | | | CH$_2$Cl$_2$ | | CHCl$_3$ | | NMP | |
| | | | Para | Meta | Para | Meta | Para | Meta |
| (structure) | 240 | 205 | i | i | i | i | i | s |
| (structure) | 241 | 224 | i | i | i | i | i | i |
| (structure) | 208 | 171 | i | i | i | i | s | s |
| (structure) | 204 | 184 | i | i | i | s | i | i |
| (structure) | 191 | 162 | i | i | i | i | s | s |

[a]From bis-(4-aminophenoxy)methane
[b]From bis-(3-aminophenoxy)methane
[c]At reflux, s-soluble, i-insoluble The above polyimides were all found to be substantially flexible tough solvent resistant films.

EXAMPLE 2

Additional polyetherimides were prepared in accordance with Heath et al., U.S. Pat. No. 3,847,867 using DAF having the formula,

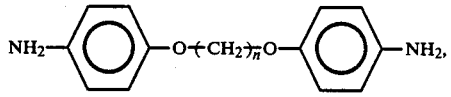

where n is 2-5 and the bisanhydride (BDA) of Example 1. Equal molar amounts of a particular DAF and BDA were used to form a polyamic acid in dimethylacetamide. The resulting polyamic acid was applied onto a glass slide and heated to 300° C. over 7 hours. The resulting polyimide film was separated from the slide after water immersion. It was a tough transparent flexible film.

The following results were obtained following the same procedure:

| DAF (CH$_2$)$_n$ | Polyetherimide T$_g$(°C.) |
|---|---|
| 2 | 183 |
| 3 | 175 |
| 4 | 162 |
| 5 | 166 |

The above results show that the T$_g$'s were less than the 217°-220° C. obtained using the same BDA with metaphenylene diamine. All of the films were transparent, flexible and solvent resistant.

Although the above examples are directed to only a few of the very many variables which can be utilized in the practice of the present invention, it should be understood that the present invention is directed to a much broader variety of polyetherimides which can be made by effecting reaction between the aromatic bis(etheranhydride) of formula (4) with the bisaminoformals of formula (1) in the presence or an organic solvent or under melt polymerization conditions.

What is claimed and sought to be protected by Letters Patent of the United States is as follows:

1. Flexible film forming transparent polyimide having a T$_g$ substantially below 217°-220° C. consisting essentially of chemically combined units of the formula

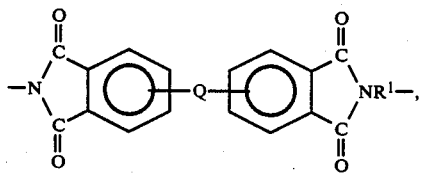

where Q is a divalent radical selected from —O—, —S—,

and ORO, R is a C$_{(6-30)}$ aromatic organic radical, R$^1$ is

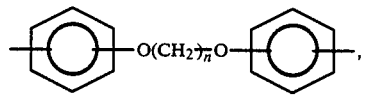

and n is an integer having a value of 1-5 inclusive.

2. A polyetherimide in accordance with claim 1, where R is

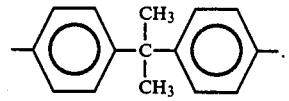

3. A polyetherimide in accordance with claim 1, where R$^1$ is

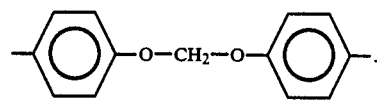

4. A polyimide in accordance with claim 1, where R$^1$ is

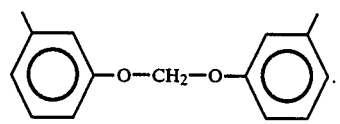

5. A polyimide in accordance with claim 1, where Q is —O—.

6. A polyimide in accordance with claim 1, where Q is —S—.

7. A polyimide in accordance with claim 1, where Q is

8. A method for making polyimide films which comprises
(1) effecting reaction between substantially equal molar amounts of aromatic bis(anhydride) of the formula

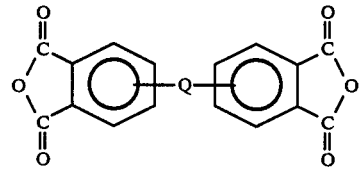

and bisaminoformals of the formula

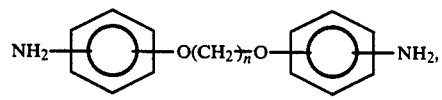

in the presence of organic solvent, and
(2) recovering a polyimide from (2), where Q is a divalent radical selected from —O—, —S—,

and ORO, and n is an integer having a value of 1-5 inclusive.

9. A method for making a polyetherimide in accordance with claim 8 where Q is

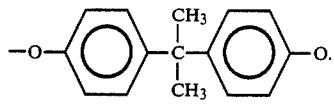

10. A method in accordance with claim 8, where an intermediate polyamic acid is made which is applied onto a substrate and heated to form a polyimide film.

11. A method in accordance with claim 8, where the polyimide is formed in a refluxing organic solvent and thereafter precipitated in a polar solvent.

* * * * *